United States Patent
Graham et al.

(10) Patent No.: US 9,365,174 B2
(45) Date of Patent: Jun. 14, 2016

(54) ADAPTIVE REMOTE BATTERY CHARGING

(71) Applicants: Eric Graham, Chicago, IL (US); Chad Beauregard, Chicago, IL (US); Bradley D. Smithson, Chicago, IL (US)

(72) Inventors: Eric Graham, Chicago, IL (US); Chad Beauregard, Chicago, IL (US); Bradley D. Smithson, Chicago, IL (US)

(73) Assignee: LITTELFUSE, INC., Chicago, IL (US)

( * ) Notice: Subject to any disclaimer, the term of this patent is extended or adjusted under 35 U.S.C. 154(b) by 117 days.

(21) Appl. No.: 14/195,631

(22) Filed: Mar. 3, 2014

(65) Prior Publication Data

US 2014/0247005 A1    Sep. 4, 2014

Related U.S. Application Data

(60) Provisional application No. 61/771,877, filed on Mar. 3, 2013.

(51) Int. Cl.
*H02J 7/00* (2006.01)
*B60R 16/03* (2006.01)

(52) U.S. Cl.
CPC ............... *B60R 16/03* (2013.01); *H02J 7/0054* (2013.01)

(58) Field of Classification Search
CPC .................................................... Y02E 60/12
USPC ............................................................ 320/107
See application file for complete search history.

(56) References Cited

U.S. PATENT DOCUMENTS

| | | | |
|---|---|---|---|
| 5,818,703 A | 10/1998 | Jacobson | |
| 5,903,764 A * | 5/1999 | Shyr | ..... H02J 7/0004 307/64 |
| 7,489,109 B1 | 2/2009 | Qian et al. | |
| 2006/0284617 A1 | 12/2006 | Kozlowski et al. | |
| 2011/0215767 A1 | 9/2011 | Johnson et al. | |

OTHER PUBLICATIONS

International Search Report and Written Opinion dated Jun. 17, 2014 from corresponding international patent application No. PCT/US2014/020005, filed Mar. 3, 2014 (10 pages).

* cited by examiner

*Primary Examiner* — Suresh Memula

(57) ABSTRACT

A battery charger device and controller is provided. The battery charger includes a DC/DC converter operative to convert an input current and an input voltage to an output current and an output voltage. The controller is configured to determine whether the input voltage is between a minimum voltage and a maximum voltage and dynamically adjust the output current based on the determination that the input voltage is between the minimum voltage and the maximum voltage.

18 Claims, 7 Drawing Sheets

ADAPTIVE REMOTE BATTERY CHARGING

CROSS-REFERENCE TO RELATED APPLICATION

This application is a non-provisional of U.S. Provisional Patent Application No. 61/771877 filed Mar. 3, 2013, the entirety of which application is hereby incorporated by reference into this application.

FIELD OF THE DISCLOSURE

This disclosure relates generally to the field of battery charging and particularly to charging remote batteries in trailers.

BACKGROUND OF THE DISCLOSURE

Remote battery charging devices are commonplace in the trucking industry. For example, in some trucks there is a battery system for a tractor portion of the truck and a remote battery for a trailer portion of the truck. The remote battery in the trailer portion may be operative to control one or more functions of the trailer such as, for instance, a lift gate for loading and unloading cargo to the trailer. A lift gate may be an electronically powered and controlled apparatus that aids in loading and unloading the trailer. It is important that the lift gate have access to a sufficient and steady power supply in terms of the voltage and current needed for its operation. Insufficient power may lead to accidents and injury of those who operate the lift gate.

In order to maintain sufficient power in the remote battery, the remote battery may be coupled with a remote battery charger. The remote battery charger must receive power from an external source in order to have the capability to charge the remote battery. The source of this power is typically the battery system of the tractor portion of the truck, since the battery system in the tractor is capable of re-charging itself (e.g., using an alternator operably coupled to an engine in the tractor, or the like).

During operation, the remote battery charger accepts an input current and voltage from the tractor battery and converts it to an output current and voltage suitable for charging the remote battery. It is often necessary to convert the input current and voltage to the output current and voltage for proper charging to occur. Said differently, the current and voltage level may need to be changed for proper charging of the remote battery. Many factors may contribute to what constitutes proper current and voltage levels for charging the remote battery.

Some conventional remote battery chargers may be configured to monitor the internal temperature of the remote battery charger and vary charging voltage and current based on this internal temperature. However, the internal temperature of battery chargers is typically much higher than the batteries they are charging. As such, existing remote battery chargers may unnecessarily reduce the current delivered to the remote battery charger.

Additionally, conventional remote battery chargers may be configured to reduce charging voltage and current when, for example, a brake, brake light or an interior light in the tractor is activated. Although this can be useful in preventing the voltage at the rear of the trailer from becoming too low for other components, such as anti-lock braking systems, it may result in the automatic disconnect of current to the remote battery regardless of the voltage and current output from the remote battery charger. Said differently, even where the output of the remote battery charger is low, voltage and current to the remote battery may be disconnected automatically due to a break light or interior light in the tractor being activated, thus reducing the overall re-charge of the remote battery under these conditions.

Furthermore, conventional remote battery chargers typically utilize a fixed target voltage throughout charging. Using a single fixed target voltage during charging can over or under charge the remote battery depending on the ambient temperature. As such, the long-term battery life and charge acceptance of the remote battery may be reduced. Additionally, many installations of batteries for trailer lift gate applications utilize different battery chemistries. Conventional remote battery chargers may not take into account the correct battery chemistry necessary to maintain safe operating voltages during charging based on the types of batteries being charged.

Additionally, conventional remote battery chargers often require a separate controller that operates within the overall charging system. This separate controller typically determines if the tractor engine is running, measures the input voltage of the tractor battery and provides an output signal that controls the operation of the above described battery charger. This necessitates additional hardware and electrical connection lines between the tractor and trailer.

It is with respect to the above that the following improvements and contributions are described.

SUMMARY

The present disclosure provides a remote battery charger configured to dynamically ensure the input line voltage at the charger never falls below a level that would be dangerous for the intended system it was installed within. In addition, the present disclosure provides a remote battery charger that includes multi-stage output charging, embedded extended charging capabilities, remote temperature based charging compensation, and the ability to selectively charge different types of batteries.

Furthermore, the present disclosure provides a battery charging system that does not require the use of an external input to trigger shutdown of the battery charger due to low system voltage. Alternatively, a battery charging system that evaluates charger input voltage and only shuts down when that input voltage is below a threshold value.

In some embodiments, a battery charger device is provided. The battery charger device may include a DC/DC converter operative to convert an input current and an input voltage to an output current and an output voltage and a controller operative to determine whether the input voltage is between a minimum voltage and a maximum voltage and dynamically adjust the output current based on the determination that the input voltage is between the minimum voltage and the maximum voltage.

Another example battery charger device may include a DC/DC converter operative to convert an input current and an input voltage to an output current and an output voltage, a low voltage disconnect (LVD) adjust setting, and a controller operative to determine whether the setting has been made, determine whether the input voltage is between an adjusted minimum voltage and a maximum voltage, and dynamically adjust the output current based on the determination that the input voltage is between the adjusted minimum voltage and the maximum voltage and the activation signal has been received.

With some embodiments, a method for controlling an output current from a battery charger operative to convert an input current and an input voltage to an output voltage and the output current is provided. The method may include determining whether the input voltage is between a minimum voltage and a maximum voltage and adjusting the output current based on the determination that the input voltage is between the minimum voltage and the maximum voltage.

BRIEF DESCRIPTION OF THE DRAWINGS

By way of example, specific embodiments of the disclosed device will now be described, with reference to the accompanying drawings, in which.

DETAILED DESCRIPTION

Figure 1:
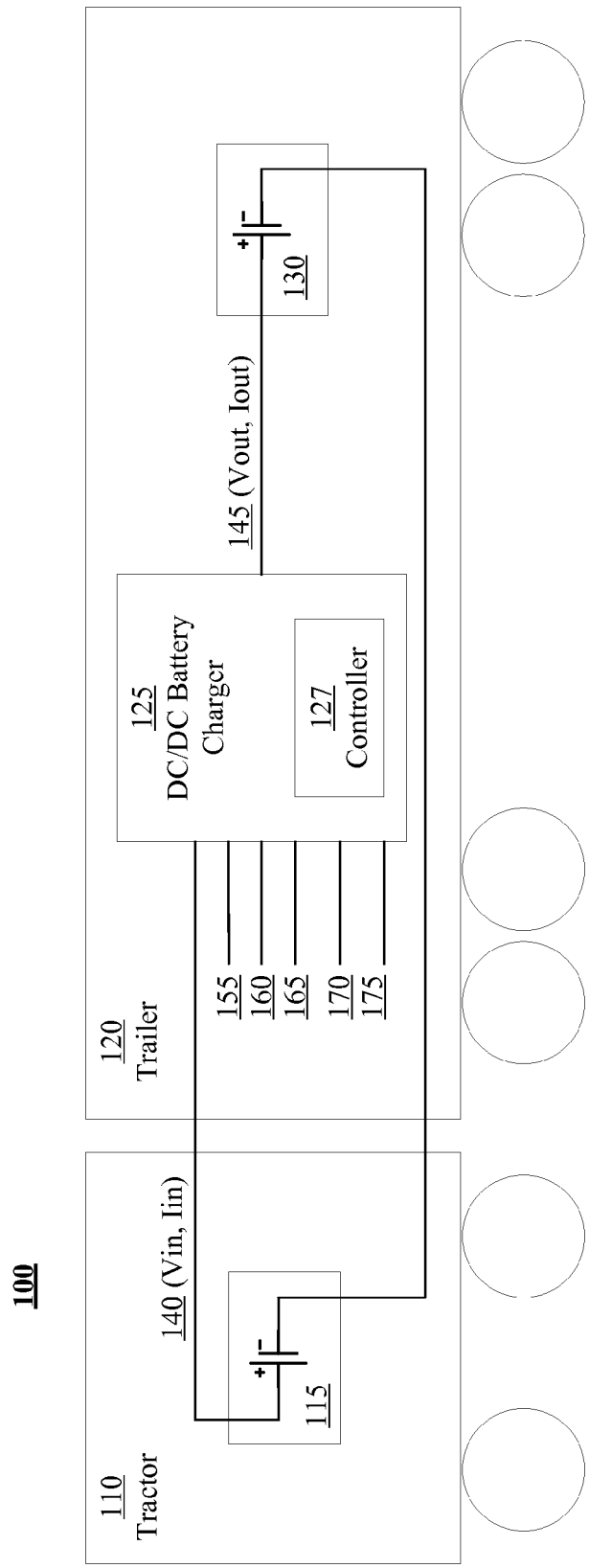
FIGS. 1-2 are block diagrams of an example remote battery charging system arranged according to embodiments of the present disclosure.

FIG. 1A is a block diagram of a remote battery charging system 100 in accordance with at least an embodiment of the present disclosure. The system 100 may be implemented in a truck comprised of a tractor 110 and a trailer 120. The tractor 110 may include a tractor battery 115, which may be used to power the electrical systems (not shown for clarity) of the tractor 110. An alternator (also not shown) may be provided to recharge the tractor batter 115. The trailer 120 may include a trailer battery 130 that is charged using a DC/DC battery charger 125. In some examples, the DC/DC battery charger 125 may be a DC to DC buck-boost converter with an input voltage range of +9.5 Vdc to +16 Vdc, with a multi-stage battery charger output, designed to charge, for example, flooded lead acid (FLA), absorbed glass mat (AGM), or any other 12 volt battery chemistries. The DC/DC battery charger 125 may include or be electrically coupled with a controller 127.

In general, the controller 127 may receive various inputs and may control the functions and outputs of the DC/DC battery charger 125. More specifically, the controller 127 may receive various inputs and control the voltage and current level supplied by the DC/DC battery charger 125 to the trailer battery 130 based on the received inputs. That is, during operations, the DC/DC battery charger 125 receives an input voltage ($V_{in}$) and an input current ($I_{in}$) from input line 140 from the tractor battery 115 and produces an output voltage ($V_{out}$) and an output current ($I_{out}$) on output line 145. The output line is electrically connected to the trailer battery 130. As such, $V_{out}$ and $I_{out}$ are used to charge the trailer batteries 130.

The controller 127 may include a low voltage disconnect (LVD) adjustment input 155. The controller 127 may adjust $V_{out}$ and/or $I_{out}$ based on the input received on the LVD adjustment input 155. For example, the controller 127 may reduce $I_{out}$ when the LVD adjustment input 155 is active.

The controller 127 may also include an internal temperature input 160. The internal temperature input 160 may receive signals including an indication of an internal temperature of the DC/DC battery charger 125. The controller 127 may be configured to adjust $V_{out}$ and/or $I_{out}$ based on the temperature received on the internal temperature input 160. For example, the controller 127 may reduce $V_{out}$ and/or $I_{out}$ as a precaution to assist in keeping the internal temperature below a maximum desired temperature.

The controller 127 may also include an external temperature input 165. The external temperature input 165 may receive signals including an indication of one or more external temperatures. For example, the controller 127 may receive signals on the external temperature input 165 indicative of temperature readings from a thermally isolated external thermistor mounted on a terminal of the tractor battery 115, a terminal of the trailer battery 130, and/or other surfaces intended to represent general ambient temperatures. The controller 127 may be configured to adjust $V_{out}$ and/or $I_{out}$ based on the temperature(s) received on the external temperature input 165. For example, the controller 127 may adjust $V_{out}$ and/or $I_{out}$ based on the temperature charge voltage table presented herein (described in greater detail below with reference to Table 1).

The controller 127 may also include one or more indicators 170. In some examples, one or more of the indicator(s) 170 may a light emitting diode (LED). The indicators 170 may be configured to provide diagnostic feedback to an operator or service technician.

The controller 127 may also include a battery chemistry selection input 175. In some examples, the battery chemistry selection input 175 may be configured to receiving an indication of the battery chemistry of the trailer battery 130.

It is important to note, that although only a single battery (i.e., the trailer battery 130) is depicted in the trailer 120, multiple batteries could be included in the trailer 120. As such, the DC/DC battery charger 125 and the controller 127 may be configured to charge one or more batteries located in the trailer 120, either as a single large battery bank, or independently as separate battery banks via multiple independent outputs. Furthermore, it is to be appreciated, that although multiple inputs to the DC/DC battery charger 125 have been introduced above, some implementations may provide more or less inputs that described. In particular, some examples described herein provide implementations where less than all of the inputs are necessary for proper operation of the DC/DC battery charger 125.

Figure 2:
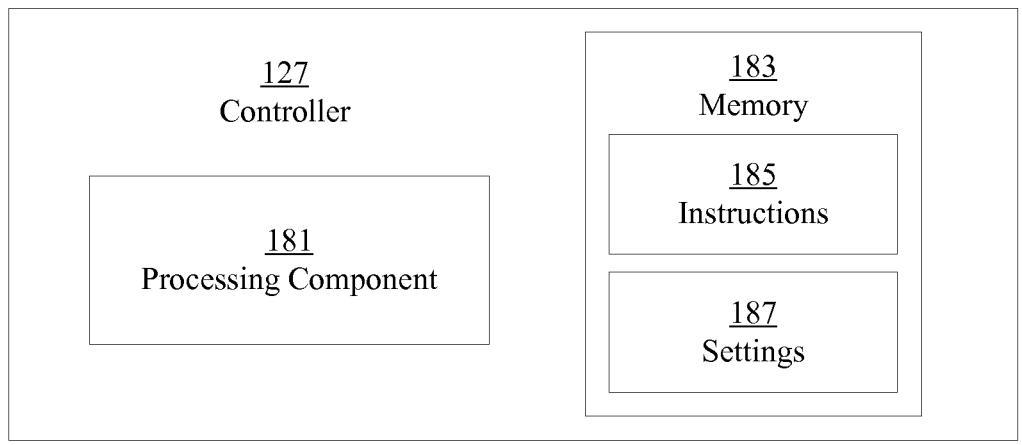

FIG. 2 illustrates a block diagram of the controller 127, arranged according to some examples of the present disclosure. The controller 127 may include a processing component 181, a memory 183, instructions 185, and settings 187. In general, the processing component 181 may be any circuitry configured to execute instructions that cause the DC/DC battery charger 125 and/or the controller 127 to perform the operations and functions described herein. For example, without limitation, the processing component 181 may be a central processing unit, a microprocessor, an application specific integrated circuit (ASIC), or a field programmable gate array (FPGA). In general, the memory 183 may be any computer-readable memory configured to store computer executable instructions and data related to the operation and control of the DC/DC battery charger 125 and/or the controller 127. For example, without limitation, the memory 183 may be read only memory (ROM), random access memory (RAM), electrically erasable programmable memory (EEPROM), optical storage media, and/or magnetic storage media. Furthermore, in some examples, the memory 183 may be non-transient.

The memory 183 may store the instructions 185. In general, the instructions 185 may be instructions executable by the processing component 181 to cause the controller 127 to perform certain operations. In some examples, the instructions may be referred to as software, firmware, or a combination of software and firmware. The memory 183 may also store the settings 187. In general, the settings 187 may correspond to operational parameters of the DC/DC battery charger 125 and/or the controller 127. More specifically, the settings 187 may correspond to various parameters used by the controller 127 in controlling the output voltage and/or current of the DC/DC battery charger 125. Additionally, the settings 187 may include various algorithms and/or decision logic corresponding to the operation of the DC/DC battery charger 125. Examples of these parameters and logic will be explained in greater detail below. It is to be appreciated, that an exhaustive list of the possible parameters and their settings is, however, not realistic to provide. For example, many parameters may depend upon the particular implementations and operating conditions of the DC/DC battery charger 125.

Furthermore, it is to be appreciated, that the controller 127 may be operably coupled to the inputs described above. More specifically, the controller 127 may receive input from the LVD adjustment input 155, the battery chemistry selection input 175, the internal temperature input 160, and/or the external temperature input 165. Additionally, the controller 127 may be configured to monitor $V_{in}$ and $I_{in}$, as well as control $V_{out}$ and $I_{out}$. Additionally, the controller 127 may be operably coupled to the indicators 170. It is to be appreciated, however, that these connections are not shown in FIG. 2 for clarity of presentation.

Various example embodiments of the DC/DC battery charger 125 and the controller 127 are now described. For convenience and clarity, these examples are discussed with reference to FIGS. 1-2. However, this is not intended to be limiting.

Example without LVD Adjustment Input

In a first example, the DC/DC battery charger 125 may be configured to operate without the LVD adjustment input 155. More particularly, the controller 127 may not receive signals on (LVD) adjustment input 155 and/or the DC/DC battery charger 125 may not include (LVD) adjustment input 155. With some examples, the controller 127 may assume an ambient temperature of 30 degrees C. In other examples, the controller 127 may receive signals on external temperature input 165 including indications of an ambient temperature. In such examples, the controller 127 may monitor the external temperature input line 165 and adjust $V_{out}$ and $V_{in}$ based on the monitored temperature.

During operation, the DC/DC battery charger 125 and the controller 127 may be configured to ensure that $V_{in}$ does not drop below 10.0 $V_{dc}$ or any other predetermined minimum $V_{in}$. More specifically, the controller 127 may be configured to ensure that $V_{in}$ is greater than 10.0 Vdc. The controller 127 may be configured to monitor $V_{in}$ and dynamically adjust Tin to ensure a minimum of 10.0 Vdc for $V_{in}$ is maintained. In some examples, $I_{in}$ may be adjusted by modifying $V_{out}$ and/or $I_{out}$.

The controller 127 may shut-off the charging capabilities of the DC/DC battery charger 125 when $V_{in}$ is less than a minimum voltage ($V_{min}$) and resume charging capabilities when $V_{in}$ is a threshold value greater than $V_{min}$. For example, in some embodiments $V_{min}$ may be +9.5 Vdc and the controller 127 may be configured to resume charging capabilities when $V_{in}$ is +0.5 Vdc greater than $V_{min}$ (or when $V_{in}$ is +10.0 Vdc).

The controller 127 may also shut-off the charging capabilities of the DC/DC battery charger 125 when $V_{in}$ is greater than a maximum voltage ($V_{max}$) and resume charging capabilities when $V_{in}$ is a threshold value less than $V_{max}$. For example, in some embodiments $V_{max}$ may be +16 Vdc and the controller 127 may be configured to resume charging capabilities when $V_{in}$ is +0.5 Vdc less than $V_{max}$ (or when $V_{in}$ is +15.5 Vdc).

In some examples, the controller may dynamically adjust $I_{out}$ based on $V_{in}$. For example, if $V_{in}$ while charging is $V_{min}$+/−0.2 Vdc, the controller 127 may prevent any further increase in $I_{out}$. If $V_{in}$ while charging is less than $V_{min}$−0.2 but greater than $V_{min}$−1.2, the controller 127 may immediately reduce $I_{out}$ by 50%. Furthermore, upon immediately reducing $I_{out}$ by 50%, the controller 127 may pause (or delay) further $V_{in}$ monitoring adjustments for a specified time (e.g., 30 seconds). If $V_{in}$ while charging is less than $V_{min}$−1.2, the controller 127 may immediately reduce $I_{out}$ out to 0 amps and pause (or delay) further $V_{in}$ monitoring adjustments for a specified time (e.g., 30 seconds).

If $V_{in}$ while charging is greater than $V_{min}$+0.2, the controller 127 may increase $I_{out}$ by 1.0 amp by adjusting a target voltage ($V_{target}$). $V_{target}$ may correspond to a desired or optimal voltage for $V_{out}$. In some examples, $V_{target}$ may be adjusted as described only if $V_{target}$ is less than a voltage target for a particular mode (explained in greater detail below) and $I_{out}$ is less than a maximum current output ($I_{max}$). $V_{target}$ may correspond to a desired $V_{out}$ or a "target voltage output" from the DC/DC battery charger 125. $I_{max}$ may correspond to the maximum current the DC/DC battery charger 125 is designed to deliver.

In some examples, the DC/DC battery charger 125 may operate with three (3) or more modes of battery charging to minimize charge times, prolong the life of the trailer battery 130, and improving performance of the trailer battery 130. The controller 127 may be configured to implement bulk, absorption, float (and possibly more) charge modes. These charging modes may be automatically selected based on settings 187. In some examples, the settings 187 may include a battery charge curve algorithm. As such, the charge mode may be automatically selected based on the settings 187. The use of multiple charging modes provides that that the trailer battery 130 is more effectively charged without over-charging the trailer battery 130.

During a bulk charge mode for example, the controller 127 may set $I_{out}$ to the maximum possible current that meets minimum acceptable $V_{in}$ and a maximum allowable internal temperature. As described above, the internal temperature input 160 may receive signal including indications of the internal temperature of the DC/DC battery charger 125. As such, the controller 127 may be configured to set $I_{out}$ to the maximum current while meeting desired operating parameters for an acceptable $V_{in}$, $V_{out}$, and internal temperature as indicated by the input on internal temperature input 160. With some examples, as noted above, $V_{min}$ (e.g., minimum voltage for $V_{in}$) may be +10.0 Vdc. In some embodiments, a maximum allowable internal temperature may be between −40 and 125 degrees C.

With some examples, the controller 127 may be configured to monitor $V_{out}$ until it reaches a target voltage for the bulk charging mode ($V_{bulk}$).

During an absorption charging mode, the controller 127 may cause a constant $V_{out}$ to be applied to the trailer battery 130 by modulating $I_{out}$. In particular, $I_{out}$ may be modulated to cause the charge of the trailer battery 130 to reach 100% capacity. For example, during the absorption charging mode, the controller 127 may generally reduce $I_{out}$ as $V_{out}$ is maintained and the trailer battery 130 approaches full charge. With some examples, the absorption mode may end once $I_{out}$ is less than a minimum output current. With some examples, this minimum output current may be 2.0 amps.

During a Float charging mode, the controller 127 may cause $V_{out}$ to be constant in order to maintain the trailer battery 130 at full charge while serving any loads drawing current from the trailer battery 130. In some examples, during a float charging mode, $V_{out}$ is targeted to $V_{float}$ for a predetermined amount of time before returning to bulk charging mode. With some examples, $V_{float}$ may be less than $V_{bulk}$. Additionally, in some examples, the controller 127 may be configured to switch the DC/DC battery charger from float charging mode to bulk charging mode after 2 hours.

With some examples, the controller 127 may be configured to adjust $V_{out}$ and $I_{out}$ based on a variety of battery chemistries. More specifically, the settings 187 may include $V_{bulk}$ and $V_{float}$ values for one or more battery chemistries (e.g., Flooded Lead Acid (FLA), Absorbed Glass Mat (AGM), or the like). In some examples, the $V_{bulk}$ and $V_{float}$ values may be different for different battery chemistries.

Additionally, the controller 127 may be configured to allow an operator to selectively determine battery chemistry. With some examples, the battery chemistry may be determined based on input received on the battery chemistry selection input 175. In some examples, battery chemistry selection may be accomplished using an external hall-effect (HE) switch, or optionally through one or more separate input logic lines. The HE switch has robust locking features to eliminate the chance of damage or inconsistent position selection. During operation, the controller 127 may read (e.g., at start-up, or the like) the HE switch (e.g., via chemistry selection input 175). In some example, the HE switch may include two positions. In a $1^{st}$ position, there will be no magnet over top of the HE switch, which may correspond to FLA battery types. In a $2^{nd}$ position, the magnet will be over the HE switch, which may correspond to AGM battery types.

In various examples, the instructions 185 and the settings 187 may cause the controller 127 to use values for $V_{bulk}$ and $V_{float}$ depending upon the ambient temperature and the battery chemistry. For example, Table 1 references various $V_{bulk}$ and $V_{float}$ values for AGM Type batteries and Flooded batteries for a variety of Ambient Temperatures.

It is worthy to note the ability to selectively determine battery chemistry is significant because battery charging devices on trailers are installed for long periods of time spanning the normal operational life of the originally installed batteries on the trailer. It is very common for replacement batteries to be of a different chemistry from the originally installed batteries due to financial or performance considerations.

TABLE 1

Three Mode Voltage Settings v. Ambient Temperature.

| Ambient Temp, C. | AGM Type Vbulk/Abs | VAGM Type Vfloat | Flooded Vbulk/Abs | Flooded Vfloat |
|---|---|---|---|---|
| −40 | 16.7 | 16 | 17.5 | 16.25 |
| −30 | 16.4 | 15.5 | 17.4 | 15.75 |
| −20 | 16.05 | 15 | 17.05 | 15.25 |
| −10 | 15.65 | 14.5 | 16.65 | 14.75 |
| 0 | 15.2 | 14.15 | 16.2 | 14.4 |
| 10 | 14.75 | 13.8 | 15.75 | 14.05 |
| 20 | 14.5 | 13.5 | 15.5 | 13.75 |
| 30 | 14.25 | 13.2 | 15.25 | 13.45 |
| 40 | 14.1 | 13 | 15.1 | 13.25 |
| 50 | 13.9 | 12.95 | 14.9 | 13.05 |
| 60 | 13.85 | 12.9 | 14.85 | 12.95 |
| 70 | 13.8 | 12.9 | 14.8 | 12.9 |
| 80 | 13.75 | 12.9 | 14.75 | 12.9 |
| 90 | 13.72 | 12.9 | 14.72 | 12.9 |
| 100 | 13.7 | 12.9 | 14.7 | 12.9 |

Example with Periodic Input Voltage Sensing

In some examples, a periodic low input voltage shut-down system is administered by controller 127. The controller 127 may periodically reduce v and $I_{out}$ to evaluate if $V_{in}$ is greater than a minimum operational voltage setting (Vop) (e.g., 13.1 Vdc, or the like). With some examples, if $V_{in}$ is less than Vop (e.g., 12.4 Vdc), the controller 127 may effectively reduce most or all output current (shut down) until $V_{in}$ is above a certain threshold ($V_{wake}$). This feature is distinguishable from many conventional applications in that the controller 127 will automatically shut-off the DC/DC battery charger 125 at a specific low operational current input voltage level. This is significant because in order for the battery charger to not drain excessive battery power from the tractor, it needs to understand whether the tractor engine is running Only through periodic inspection of the input voltage can the controller determine whether the tractor is running and charging power is available to be received by the battery charger for charging the trailer batteries.

Example with Extended Shutdown

In some examples, the DC/DC battery charger 125 may include the ability to continue to charge the trailer battery 130 for a period of time even when the tractor 110 is off Said differently, the controller 127 may include the ability to charge the trailer battery 130 even when an engine in the tractor 110 is off. This is facilitated by adjusting a low-voltage disconnect threshold ($V_{lvd}$), described in greater detail below.

With some examples, the controller 127 may periodically (e.g., every 120 seconds, or the like) turn the DC/DC battery charger 125 off and monitor $V_{in}$ with no current flowing through the DC/DC battery charger 125. The controller 127 may determine whether $V_{in}$ is between 13.1 Vdc and 16 Vdc (indicating the charge voltage present at the input of the device). If $V_{in}$ is within this range, the controller 127 may turn the DC/DC battery charger 125 back on and resume charging at the same charge mode and with the same $I_{out}$ and $V_{out}$ used immediately before shut-down. If, however, $V_{in}$ is less than 12.7 Vdc the DC/DC battery charger 125 will be shut down.

In some examples, an extended charge capability may be provided either through controller firmware differences or via a Low Voltage Adjust Input Signal. In extended charge mode, the controller 127 may repeatedly turn off the DC/DC battery charger 125 and monitor $V_{in}$ as described above. However, when extended charge is enabled, the $V_{in}$ after the charger is periodically turned off need only be greater than 12.4 Vdc, for example, to resume charging. As such, the DC/DC battery charger 125 may continue charging the trailer battery 130 after the engine of tractor 110 shuts down while eventually shutting off at a point that ensures that sufficient voltage is present in the tractor battery 115 to start the tractor 110 at a later time by not restarting the DC/DC battery charger 125 if the input voltage is less than 12.4 Vdc. This feature is significant because many trailers which this device is intended make frequent stops at which point the tractor engine is turned off. Without the ability to use tractor battery power while the engine is off the trailer batteries will not receive the maximum possible re-charge.

With some examples, the extended charge capability may be selected using a HE switch. In other examples, extended charge capability may be supplied to the controller 127 on a digital input port to be read once at start-up. Any changes to the extended charge capability may optionally require a complete power cycle of the controller 127. The ability to selectively determine whether to implement extended charging when the tractor is not running in significant because it allows for rapid in field adjustments to operational performance depending on situational needs.

Figure 3:
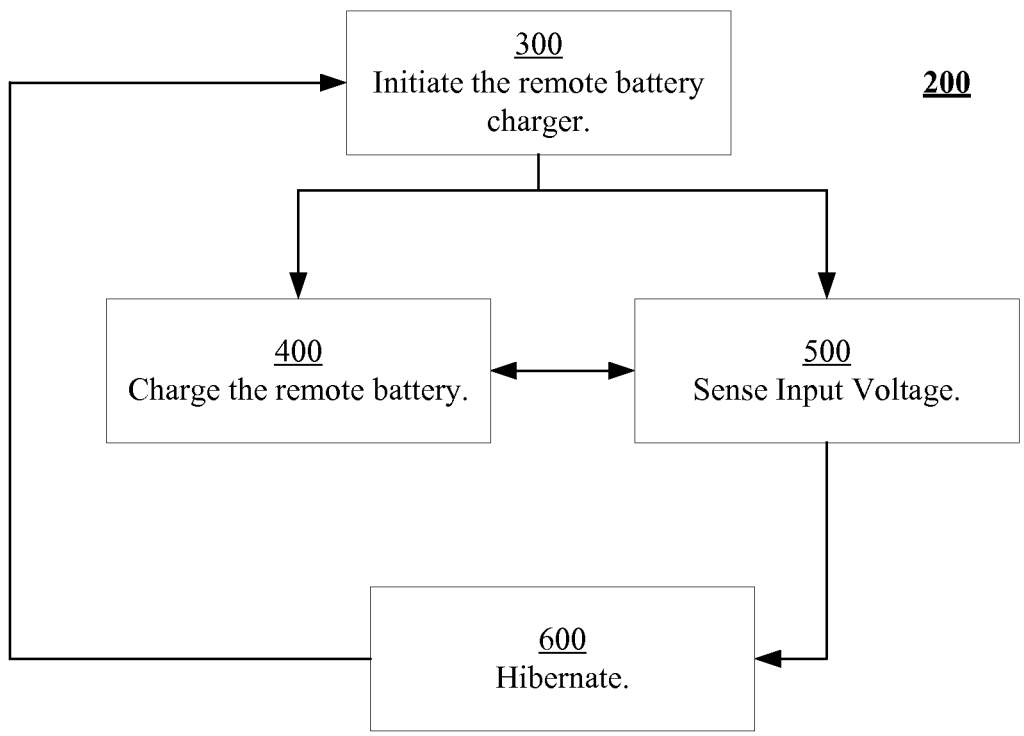
FIGS. 3-7 are logic diagrams of example methods of dynamically adjusting charging voltage and current according to embodiments of the present disclosure.

FIGS. 3-7 illustrate logic flows for dynamically adjusting output voltage and/or current of a remote battery charger according to various embodiments of the present disclosure. In general, FIG. 3 illustrates a main logic flow 200 comprising multiple "sub-logic" flows. More specifically, the logic flow 3 includes logic flow 300 to initiate the DC/DC battery charger 125, a logic flow 400 to charge the trailer battery 130, a logic flow 500 to periodically sense the input voltage $V_{in}$ on line 140, and a logic flow 600 to place the DC/DC battery charger 125 in a hibernation state. FIGS. 4-7 depict details of the logic flows 300-600, respectively. Discussion of each of FIGS. 4-7 references FIGS. 1-2 as well of the other logic flows described herein in FIGS. 3-7. However, embodiments are not limited in this context.

Figure 4:
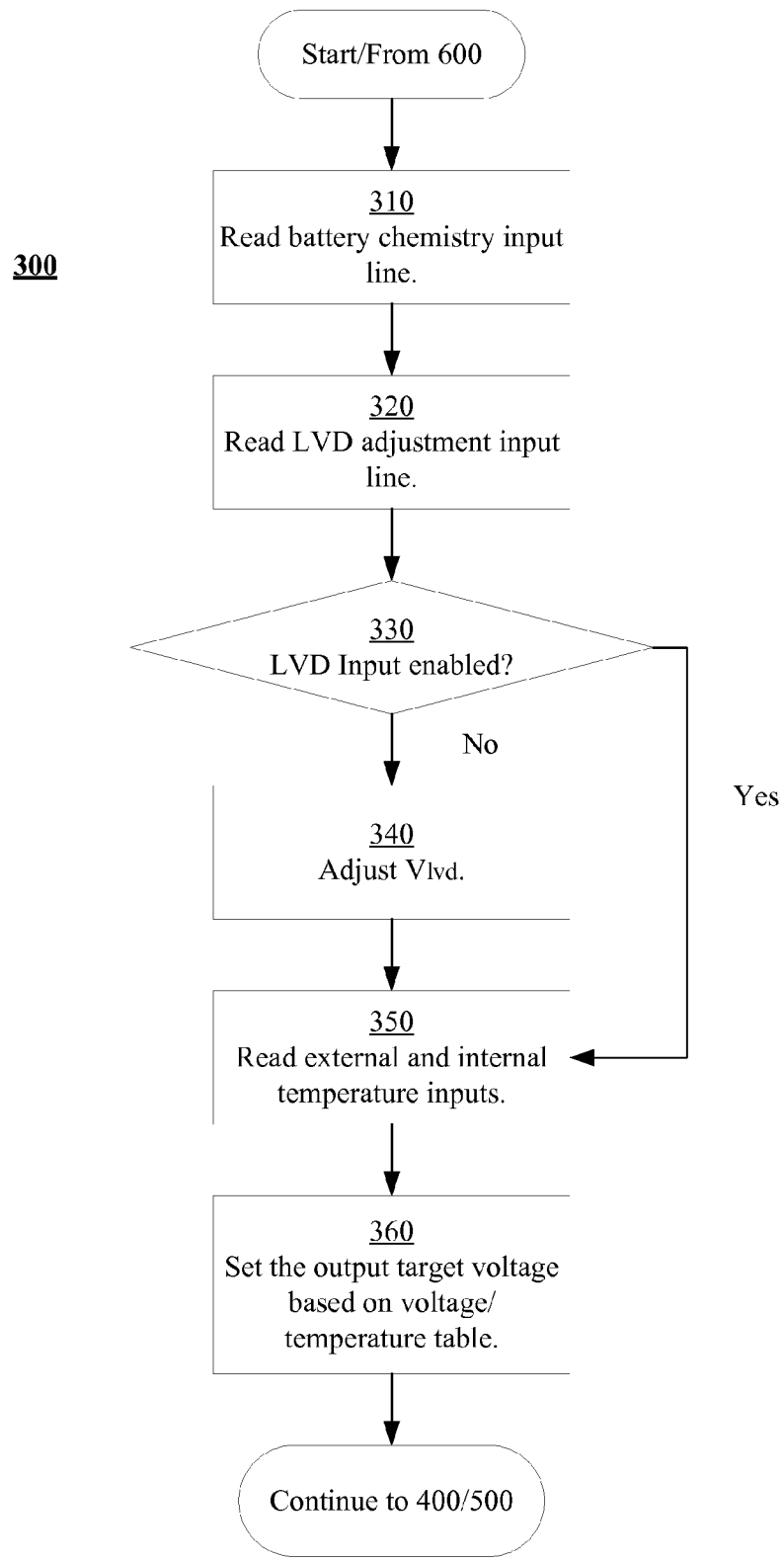

Turning more specifically to FIG. 3, the logic flow 200 may include the logic flow 300 where the DC/DC battery charger 125 is initiated (refer to FIG. 4). Continuing to both logic flows 400 and 500, the DC/DC battery charger 125 actively charges the remote battery (refer to FIG. 5) and periodically senses the input voltage $V_{in}$ on line 140 (refer to FIG. 6) to determine whether place the charger in hibernation mode.

It is important to note, that in some examples, the logic flows 400 and 500 are executed in parallel. More particularly, the "active charging" logic flow 400 is executed in parallel with the "shut-down" logic flow 500. Accordingly, during execution of the logic flow 300, if the input voltage $V_{in}$ measured during the logic flow 500 is below a low-voltage disconnect threshold (Viva), the controller 127 may place the DC/DC battery charger 125 in hibernation mode (e.g., logic flow 600). That is, from the logic flow 500, the logic flow 200 may continue to the logic flow 600 where the DC/DC battery charger 125 is placed in a hibernation state. In the hibernation state (refer to FIG. 7) the DC/DC battery charger draws very little current, but does continue to monitor the input line 140 and the logic flow 200 may continue to the logic flow 300. That is, the charger may "wake-up" or leave hibernation mode and resume charging.

Turning more specifically to FIG. 4, the logic flow 300 may be executed to initiate the DC/DC battery charger 125. The logic flow 300 may begin at block 310, read battery chemistry input 175. The controller 127 may read the state of the battery chemistry selection input 175 to determine the battery chemistry corresponding to the trailer battery 130. As will be described below, the state of the battery chemistry selection input 175 may be used to determine the appropriate Charging Voltage versus Ambient Temperature table (e.g., refer to Table 1) to use in setting the target voltage threshold.

Continuing to block 320, read external LVD adjustment input line 170, the controller 127 may read the external LVD adjustment input line 155.

The logic flow 300 may continue to block 330, at block 330, determine whether the (LVD) adjustment input 155 is disabled, the controller 127 may determine whether the LVD input line is enabled. As described above, the LVD input line 155 may be activated to indicate that the DC/DC battery charger 125 should continue to operate after the tractor 110 has been shut off. From block 330, the logic flow may continue to block 340 or block 350.

At block 340, adjust the low-voltage disconnect voltage Viva threshold; the controller 127 may adjust (either up or down) the $V_{lvd}$ threshold based on the determination that the (LVD) adjustment input 155 is enabled. It is to be appreciated, that is the LVD input is disabled (e.g., off), then the logic flow 300 may skip block 340. As such, the $V_{lvd}$ threshold may not be adjusted. That is, the default $V_{lvd}$ threshold level will not be adjusted. With some examples, the $V_{lvd}$ threshold may have a default value between 9.5 Vdc and 12.4 Vdc, or the like. However, embodiments are not limited in this context and example $V_{lvd}$ threshold levels are provided for illustration only and may depend upon the particular implementation.

Continuing to block 350, read the internal and external temperature input lines; the controller 127 may read the internal and external temperature input lines 160 and 165. Continuing to block 360, set the output target voltage based on the temperature inputs and the battery chemistry; the controller 127 may set the output target voltage based on the internal temperature input 160, the external temperature input 165, and the battery chemistry selection input 175. For example if an external temperature reading is found (e.g., at block 350), the controller 127 uses this to determine the output voltage targets. If not, the internal temperature input (e.g., read at block 350) is used for determining the charging voltage targets. Furthermore, the output voltage target may be set based on the battery chemistry (e.g., read at block 310). More specifically, the column used to set the output voltage target may be selected to correspond to the battery chemistry indicated on the chemistry selection input 175. With some example, other algorithms or charge curves may be used besides the table detailed herein.

From block 360, the logic flow 300 may continue to both logic flows 400 and 500. As detailed above, logic flows 400 and 500 are executed in parallel. In general, the logic flow 400 corresponds to the multi-stage charging process while the logic flow 500 corresponds to the shutdown detection process.

Figure 5:
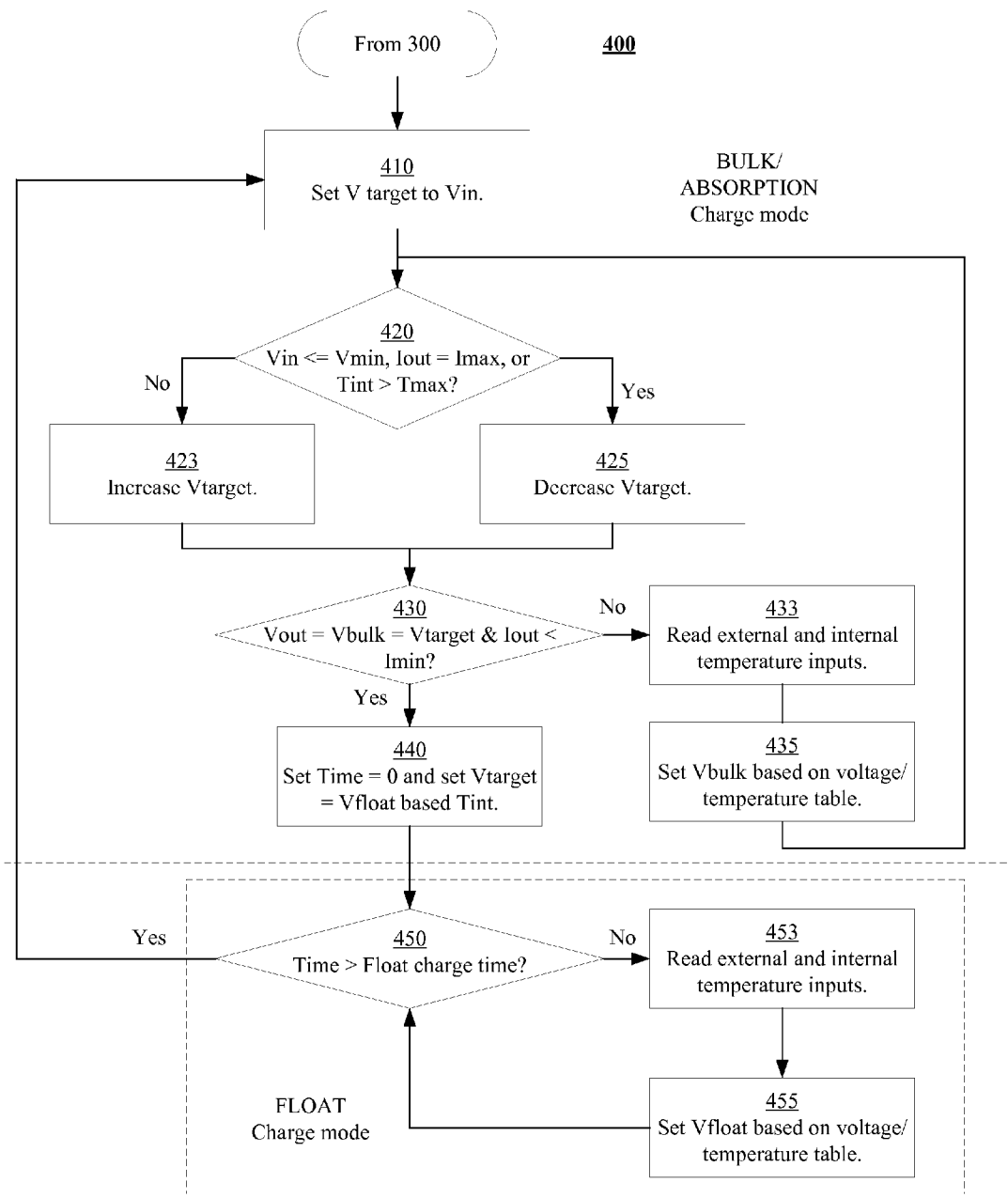

Turning more specifically to FIG. 5, the logic flow 400 may begin at block 410. At block 410, set $V_{target}$ to $V_{in}$; the controller 127 may set $V_{target}$ equal to $V_{in}$. In some examples, the controller 127 may set $V_{target}$ to equal $V_{in}$ to ensure a smooth ramp-up of current and charging voltage.

Continuing to block 420, "$V_{in}<=V_{min}$, $I_{out}=I_{max}$, or Tint>$T_{max}$"; three comparisons are made. More specifically, the controller 127 compares the input voltage $V_{in}$ from line 140 to the minimum allowable operating input voltage $V_{min}$ to determine whether $V_{in}<=V_{min}$. Additionally, the controller 127 compares the internal temperature Tint to the maximum safe internal temperature $T_{max}$ to determine whether Tint>$T_{max}$. Additionally, the controller 127 compares the output current $I_{out}$ to the maximum rated output current $I_{max}$ to determine whether $I_{out}=I_{max}$. As depicted in FIG. 5, if any of the three conditions are true, the logic flow 400 may proceed to block 425. Otherwise if all three comparisons are false, the logic flow 400 may proceed to block 423.

At block 423, the output target voltage ($V_{target}$) is increased by a small incremental value (e.g., 0.01 Vdc, or the like). The result of this action is that the DC/DC charger 125 will increase output charging current $I_{out}$, decrease input voltage $V_{in}$, increase output voltage $V_{out}$, and over time increase internal temperature Tint.

At block 425, the output target voltage ($V_{target}$) is decreased by a small incremental value (e.g., 0.01 Vdc, or the like). The result of this action is that the DC/DC charger 125 will decrease output charging current $I_{out}$, increase input voltage $V_{in}$, decrease output voltage $V_{out}$, and over time decrease internal temperature Tint.

From blocks 423 and 425, the logic flow 400 continues to block 430. At block 430, "$V_{out}$=Vbulk=$V_{target}$ & $I_{out}<I_{min}$"; two comparisons are made. In general, the controller 127 compares the output voltage $V_{out}$ and the output charging current $I_{out}$ to various setpoints to determine whether the bulk and absorption charging modes have been completed. More specifically, the controller 127 compares the output voltage $V_{out}$ to the bulk charging voltage $V_{bulk}$ (e.g., as determined based on the battery chemistry) to determine whether $V_{out}=V_{bulk}=V_{target}$. Additionally, the controller 127 compares the output current $I_{out}$ to a minimum output current threshold $I_{min}$ (e.g., 1.0 Amp, or the like) determine whether $I_{out}<$Imin. As depicted in FIG. 5, if either of the above conditions are false, the logic flow 400 proceeds to block 433. Otherwise, if both conditions are true, the logic flow continues to block 440.

At block 433, read internal and external temperature inputs; the controller 127 reads the internal and external temperature inputs 160 and 165. Continuing to block 435, set $V_{bulk}$ based on the temperature inputs and the battery chemistry; the controller 127 may set the output target voltage based on the internal temperature input 160, the external temperature input 165, and the battery chemistry selection input 175. For example if an external temperature reading is found (e.g., at block 433), the controller 127 uses this to determine the output voltage targets. If not, the internal temperature input (e.g., read at block 433) is used for determining the charging voltage targets. Furthermore, the output voltage target may be set based on the battery chemistry (e.g., read at block 310 from logic flow 300).

The logic flow continues from block 435 to block 420. More particularly, the logic flow 400 returns back to block 420 as part of the bulk/absorption charging cycle. The progression of the bulk/absorption charging cycle is that maximum possible output charging current $I_{out}$ is applied during bulk charging until the battery voltage $V_{out}$ reaches the proper target voltage per the battery chemistry $V_{bulk}$ and external ambient temperature Text. Thereafter, the output voltage $V_{out}$ is maintained to the ideal charging voltage $V_{bulk}$ until the charging current $I_{out}$ is less than 1.0 Amps, indicating that the battery is at a highly charged state.

At block 440, set Time=0 and set $V_{target}=V_{float}$ based on Tint; the controller 127 sets a timer to zero and begins the time. Said differently, the controller begins counting time from 0. Additionally, at block 440, $V_{target}$ is lowered to a new float charging setting based on the battery chemistry (e.g., refer to block 310 of logic flow 300) and the instantaneous external temperature Text.

Continuing from block 440 to block 450, "Time>Float charge time"; the controller determines whether the time (e.g., based on the timer started at block 440) is greater than a float charge time. The float charge time may vary. For example, the float charge time may be a specified time, for example, between 30 minutes and 4 hours. If the time has not been completed, the logic flow 400 proceeds to block 453. If the time has been completed, the logic flow 400 returns to block 410 where the bulk/absorption charge cycle is restarted. At block 453 read internal and external temperature inputs; the controller 127 reads the internal and external temperature inputs 160 and 165. Continuing to block 455, set $V_{float}$ based on the temperature inputs and the battery chemistry; the controller 127 may set the output target voltage based on the internal temperature input 160, the external temperature input 165, and the battery chemistry selection input 175. For example if an external temperature reading is found (e.g., at block 453). Continuing from block 455, the logic flow returns to block 450. Accordingly, the controller makes minor adjustment to $V_{float}$ based on the external and internal temperatures Text and Tint until the predetermined amount of time has passed (e.g., Time>Float charge time).

Figure 6:
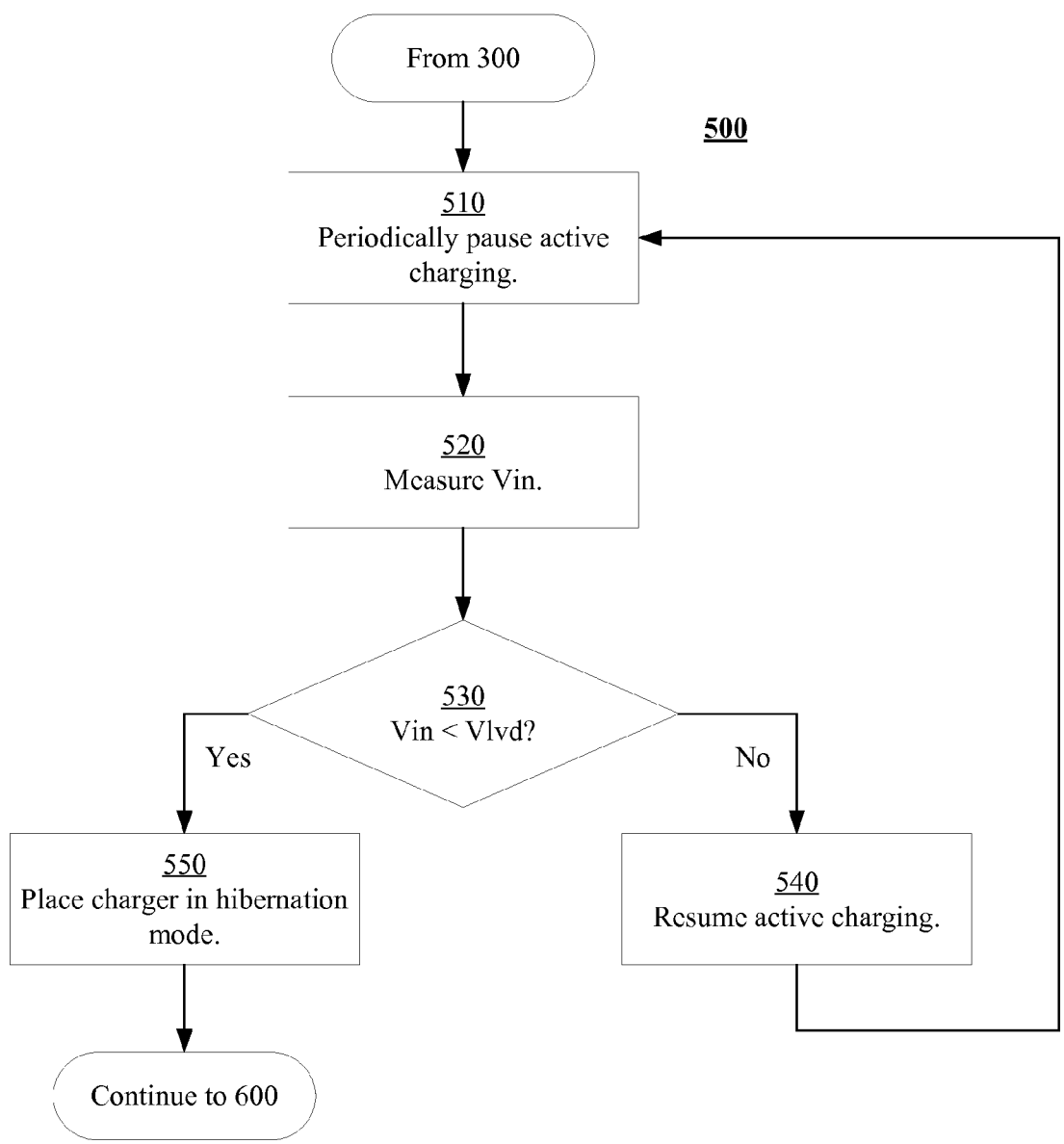

Turning more specifically to FIG. 6, the logic flow 500 is described. In general, the logic flow 500 provides a parallel process to logic flow 400 where input voltage $V_{in}$ may be evaluated with little to no charging current from the DC/DC battery charger. The logic flow 500 may begin at block 510. At block 510, active charging (e.g., logic flow 400) may be periodically paused. For example, with some embodiments, active charging may be paused every 2 minutes. With some examples, the active charging may be paused every 1 to 10 minutes. Examples are not limited in this context. In particular, at block 510, the controller 127 may reduce charging current $I_{out}$ to approximately or substantially 0 Amps. Said differently, at block 510, a constantly repeating countdown timer is initiated which when activated causes the battery charger to reduce output current $I_{out}$ significantly.

Continuing to block 520, measure $V_{in}$, the controller 127 may measure input voltage $V_{in}$. In some examples, the controller 172 may measure $V_{in}$ a specified time after $I_{out}$ has been reduced to substantially 0 Amps. For example, the controller 127 may measure $V_{in}$ 5 seconds after $I_{out}$ has been reduced to 0 Amps, or the like. For example, once the output current $I_{out}$ is substantially reduce to 0 Amps, the cable providing input power to the DC/DC battery charger 125 from the tractor 110 can be used as a voltage sensing line to determine if a charging source (e.g., the tractor engine, or the like) is active and providing charging voltage.

Continuing to block 530, "$V_{in}<V_{lvd}$", the input voltage $V_{in}$ is compared to the low-voltage disconnect threshold Viva. At block 530 the controller 127 compares $V_{in}$ to Viva to determine whether $V_{in}$ is less than $V_{lvd}$. As described above, $V_{lvd}$ may be modified during logic flow 300 (e.g., at block 340). As depicted in FIG. 6, if $V_{in}>=V_{lvd}$ the logic flow 500 may proceed to block 540 where active charging is resumed at the target voltage at which it was paused. Said differently, the controller 127 may cause the DC/DC battery charger to resume active charging based on the determination that $V_{in}>=V_{lvd}$. From block 540, the logic flow 500 returns to block 510 where the periodic interrupt timer is again monitored.

If the input voltage $V_{in}$ is less than the disconnect voltage $V_{lvd}$ the logic flow 500 may proceed to block 550. At block 550, place charger in hibernation mode, the controller 127 may place the DC/DC charger 125 in a sleep/hibernate state where the charger draws very little quiescent current. From block 550, the logic flow continues to logic flow 600.

Figure 7:
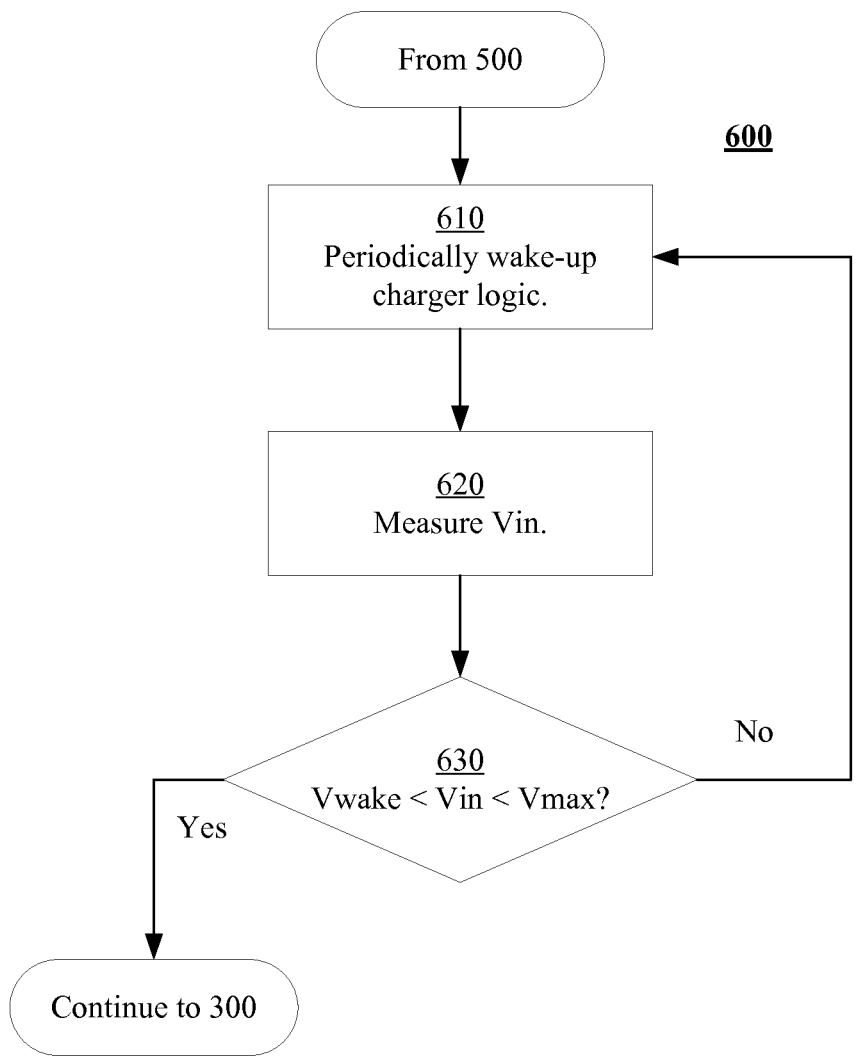

Turning more specifically to FIG. 7, the logic flow 600 is described. In general, the logic flow 600 describes operations of the controller 127 to wake-up from hibernation as described herein. Logic flow 600 may begin at block 610, periodically wake-up charger logic. At block 610, the controller 127 may be programmed to periodically wake up. Continuing to block 620, measure $V_{in}$, the controller 127 may inspect the voltage input $V_{in}$. Continuing to block 630, "$V_{wake}<V_{in}<V_{max}$", the input voltage $V_{in}$ may be compared to $V_{wake}$ and $V_{max}$. In particular, the controller 127 may compare $V_{in}$ to $V_{wake}$ and $V_{max}$ to determine whether $V_{in}$ is greater than $V_{wake}$ and less than $V_{max}$. The logic flow 600 may return to 610 based on the determination that $V_{in}$ is not between $V_{wake}$ and $V_{max}$. Alternatively, the logic flow 600 may proceed to the logic flow 300 (e.g., refer to FIG. 4) if $V_{in}$ is between $V_{wake}$ and $V_{max}$; thus exiting hibernation mode and beginning initiation of active charging.

The invention claimed is:

1. A battery charger device comprising:
   a DC/DC converter operative to convert an input current and an input voltage to an output current and an output voltage;
   a countdown timer; and
   a controller comprising a low voltage discharge adjustment input, the controller operative to:
   determine whether the input voltage is between a minimum voltage and a maximum voltage;
   dynamically adjust the output current or an output voltage target based on the determination that the input voltage is between the minimum voltage and the maximum voltage;
   initiate the countdown timer to constantly repeat;
   when the countdown timer is activated, reduce the output current;
   determine whether the input voltage is greater than a minimum threshold value; and maintain the output current at a reduced state or further reduce the output current down to a specific value based on the determination that the input voltage is less than the minimum threshold value.

2. The battery charger of claim 1, the controller further operative to:
determine whether the input voltage is within a threshold of the minimum voltage; and
prevent any increase or decrease of the output current or the output voltage target based on the determination that input voltage is within the threshold of the minimum voltage.

3. The battery charger of claim 1, the controller further operative to:
determine whether the input voltage is less than the minimum voltage; and
reduce the output current or the output voltage target based on the determination that the input voltage is less than the minimum voltage.

4. The battery charger of claim 1, the controller further operative to:
determine whether the input voltage is greater than the minimum voltage; and
increase the output current or the output voltage target based on the determination that the input voltage is greater than the minimum voltage.

5. The battery charger of claim 1, the controller further operative to:
receive an indication of a battery chemistry; and
dynamically adjust target output voltage or current based at least in part on the battery chemistry.

6. The battery charger of claim 1, the controller further operative to:
receive an indication of an external ambient temperature; and
dynamically adjust the output voltage target or the output current based at least in part on the external ambient temperature.

7. The battery charger of claim 1, the controller further operative to:
receive an indication of an internal temperature; and
adjust the output voltage target or the output current based at least in part on the internal temperature.

8. The battery charger of claim 7, wherein the controller dynamically adjusts the output target voltage or the output current.

9. The battery charger of claim 1, the controller further operative to:
monitor the period of time during charging; and
adjust the output voltage target or the output current based on two or more unique charging modes, wherein the two or more unique charging modes may cause the charger to implement differing output voltage targets, maximum output current limits, or charge mode time durations.

10. The battery charger of claim 1, the controller further operative to:
pause charging operation by periodically reducing the output current;
determine whether the input voltage is greater than a minimum threshold value; and
resume charging operation.

11. The battery charger of claim 1, the controller further operative to:
receive a voltage setting adjustment indication and
change at least one of the minimum voltage and the maximum voltage.

12. The battery charger of claim 1, the controller further operative to:
receive a voltage setting adjustment indication and change an input voltage threshold used determine whether stop or continue charging.

13. A method for controlling an output current or an output voltage target from a battery charger operative to convert an input current and an input voltage to an output voltage and the output current, the method comprising:
determining whether the input voltage is between a minimum voltage and a maximum voltage;
adjusting the output current or the output voltage target based on the determination that the input voltage is between the minimum voltage and the maximum voltage;
reducing the output current or the output voltage target periodically;
determining whether the input voltage is greater than a minimum operation voltage; and
decreasing the output current or the output voltage target based on the determination that the input voltage is less than the minimum operation voltage; or
resuming normal operation of the battery charger based on the determination that the input voltage is greater than the minimum operation voltage.

14. The method claim 13, further comprising:
determining whether the input voltage is within a threshold value of the minimum voltage; and
preventing any increase or decrease of the output current or the output voltage target based on the determination that input voltage is within the threshold value of the minimum voltage.

15. The method of claim 13, further comprising:
determining whether the input voltage is less than the minimum voltage; and
reducing the output current or the output voltage target based on the determination that the input voltage is less than the minimum voltage.

16. The method of claim 13, further comprising:
determining whether the input voltage is greater than the minimum voltage; and
increasing the output current or the output voltage target based on the determination that the input voltage is greater than the minimum voltage.

17. The method of claim 13, further comprising:
receiving an activation signal on an external low voltage adjustment input;
changing at least one of the minimum voltage and the maximum voltage based on the activation signal.

18. The method of claim 13, further comprising:
receiving an activation signal on an external voltage adjustment input; and
changing the minimum operation voltage based on the activation signal.

* * * * *